US011317140B2

(12) United States Patent
Nishimura

(10) Patent No.: US 11,317,140 B2
(45) Date of Patent: Apr. 26, 2022

(54) SYSTEMS AND METHODS FOR SELECTIVELY STORING SPECIFIC VERSIONS OF MEDIA ASSETS

(71) Applicant: Rovi Guides, Inc., San Jose, CA (US)

(72) Inventor: Akitaka Nishimura, Tokyo (JP)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/156,831

(22) Filed: Jan. 25, 2021

(65) Prior Publication Data

US 2021/0235152 A1    Jul. 29, 2021

Related U.S. Application Data

(63) Continuation of application No. 16/066,124, filed as application No. PCT/US2016/056114 on Oct. 7, 2016, now Pat. No. 10,931,998.

(51) Int. Cl.
*H04N 21/4335* (2011.01)
*H04N 21/442* (2011.01)

(52) U.S. Cl.
CPC ... *H04N 21/4335* (2013.01); *H04N 21/44204* (2013.01); *H04N 21/44222* (2013.01)

(58) Field of Classification Search
CPC ......... H04N 21/4335; H04N 21/44204; H04N 21/44222
See application file for complete search history.

(56) References Cited

U.S. PATENT DOCUMENTS

| 5,909,689 | A  | 6/1999  | Van Ryzin        |
|-----------|----|---------|------------------|
| 6,239,794 | B1 | 5/2001  | Yuen et al.      |
| 6,388,714 | B1 | 5/2002  | Schein et al.    |
| 6,564,378 | B1 | 5/2003  | Satterfield et al. |
| 6,756,997 | B1 | 6/2004  | Ward et al.      |
| 7,165,098 | B1 | 1/2007  | Boyer et al.     |
| 7,761,892 | B2 | 7/2010  | Ellis et al.     |
| 8,046,801 | B2 | 10/2011 | Ellis et al.     |
| 2001/0005903 | A1 | 6/2001 | Goldschmidt et al. |

(Continued)

OTHER PUBLICATIONS

Brian Knittel, Paul McFedries, "Windows 8.1 In Depth", Mar. 21, 2014, Chapter excerpt from book (Year: 2014).*
"ISR and Written Opinion", International Search Report and Written Opinion of PCT/US2016/056114 dated Jul. 5, 2017 (16 pages).

(Continued)

*Primary Examiner* — Fernando Alcon
(74) *Attorney, Agent, or Firm* — Haley Guiliano LLP

(57) ABSTRACT

Systems and methods provided herein for intelligently distinguishing between different versions of a media asset and selectively storing those requested media assets that differ from versions that were previously stored in some predefined characteristics. These systems and methods, upon identifying a version of the requested media asset was previously stored, determine a characteristic of the requested media asset. These systems and methods compare the characteristic of the requested media asset with a corresponding characteristic of the version of the requested media asset that was previously stored to determine a difference between the two versions. The systems and methods then determine whether the difference in characteristic renders the requested media asset preferable over the previously stored version. Upon determining that the requested media asset is preferable over the previously stored version, the systems and methods store the requested media asset.

20 Claims, 8 Drawing Sheets

(56) References Cited

U.S. PATENT DOCUMENTS

| | | | |
|---|---|---|---|
| 2001/0007147 A1 | 7/2001 | Goldschmidt et al. | |
| 2001/0042073 A1 | 11/2001 | Saether et al. | |
| 2002/0174430 A1 | 11/2002 | Ellis et al. | |
| 2003/0110499 A1 | 6/2003 | Knudson et al. | |
| 2003/0149980 A1 | 8/2003 | Hassell et al. | |
| 2005/0021570 A1 | 1/2005 | Thompson | |
| 2005/0251827 A1 | 11/2005 | Ellis et al. | |
| 2007/0124769 A1* | 5/2007 | Casey | H04N 21/47202 725/46 |
| 2007/0124781 A1* | 5/2007 | Casey | H04N 21/6125 725/94 |
| 2007/0154169 A1 | 7/2007 | Cordray et al. | |
| 2007/0157240 A1 | 7/2007 | Walker | |
| 2010/0153885 A1 | 6/2010 | Yates | |
| 2013/0120389 A1* | 5/2013 | Moguillansky | G06T 3/4092 345/428 |
| 2014/0153907 A1* | 6/2014 | Farah | H04N 9/7921 386/297 |
| 2015/0350736 A1* | 12/2015 | Chan | H04N 21/2365 725/93 |

OTHER PUBLICATIONS

"Second Written Opinion", IPEA Second Written Opinion of PCT/US2016/056114 dated Sep. 12, 2018 (8 pages).

Anonymous: "JavaScript Messagebox", Dec. 19, 2015 (Dec. 19, 2015), pp. 1-3, XP55877210, Retrieved from the Internet: URL:https://web.archive.org/web/20151219055050/https://www.tutorialsteacher.com/javascript/display-popup-message-in-javascript.

Anonymous: "The Java Tutorials: How to Make Dialogs", Oct. 4, 2015 (Oct. 4, 2015), pp. 1-8, XP55877555, Retrieved from the Internet: URL: https://web.archive.org/web/20151004032132/https://docs.oracle.com/javase/tutorial/uiswing/components/dialog.html.

* cited by examiner

200

202

204
How I Met Your Mother, Series Finale

208 210
Characterstics : SD, French Subtitles

212
Play

214
Store

216

218
A Version of "How I Met Your Mother, Series Finale" was Previously Stored

220
Characterstics of Previously Recorded Version : SD /222
Actual Ending /224
Spanish Subtitles /226

228
The Requseted Media Asset "How I Met Your Mother, Series Finale" will not be Stored

230
Override and Store Requested Version

232
Transfer Previous Version to Different Device

302
You have Requested to Store 4K Version of "How I Met Your Mother, Season Finale" on your Cell Phone
304

306
Your Cell Phone does not support 4K Videos

308
The Requested Version of "How I Met Your Mother, Series Finale" will not be Stored

310
312
Your 4K Television connected to DVR Supports 4K Videos

314
Store on DVR

FIG. 3

SYSTEMS AND METHODS FOR SELECTIVELY STORING SPECIFIC VERSIONS OF MEDIA ASSETS

CROSS-REFERENCE TO RELATED APPLICATIONS

This application is a continuation application of U.S. patent application Ser. No. 16/066,124, filed Jun. 26, 2018, which is a national stage application under 35 U.S.C. § 371 of International Application PCT/US2016/056114, filed Oct. 7, 2016, each of which is hereby incorporated by reference herein in its entirety.

BACKGROUND

In media systems in the related art, a media asset may be available in different versions from one or more sources. For example, different versions of a media asset may differ in resolution, audio support, content, language of sub-titles, ratings and other such features. Media storage systems often receive requests to store a media asset that has been previously stored. In such situations, media storage systems always store the media asset, provided that there is available storage space to do so. As a result, multiple copies of the same version of a media asset may be stored, resulting in inefficient usage of storage capacity.

SUMMARY

Systems and methods are provided herein for selectively re-storing versions of a media asset that are preferable to a user over versions of the media asset that were previously stored. By doing so, these systems and methods prevent the user from wasting storage capacity by re-storing less preferred versions of media assets. These systems and methods, upon receiving a request to store a first version of a media from a user, determine whether a second version of the media asset was previously stored by the user. Upon determining that a second version of the media asset was previously stored by the user, these systems and methods determine whether the user prefers the second version to the first version. The systems and methods may determine which version is preferable by comparing a characteristic associated with the first version with a corresponding characteristic associated with the second version to determine a difference between the two versions. The systems and methods may then compare the determined difference in characteristic with entries in a list of pre-defined differences between the first version and the second version for which the first version should be stored to determine whether the user prefers the first version. The systems and methods, in response to determining that the user prefers the first version to the second version, store the first version. The systems and methods, in response to determining that the user prefers the second version, refrain from storing the first version.

In some aspects, a media guidance application may receive, from a user, a request to store a media asset. For example, the media guidance application may receive a request from a user Tom to record the media asset "How I Met Your Mother, Series Finale" on a DVR. As another example, the media guidance application may receive a request from the user Tom to burn the media asset "How I Met Your Mother, Series Finale" on a DVD. The media guidance application may access a data structure, associated with a profile of the user, that contains information about media assets that were previously stored by the user to determine whether a version of the media asset was previously stored by the user. For example, the media guidance application may access a user history table data structure associated with Tom's user profile to determine whether a version of the media asset "How I Met Your Mother, Series Finale" was previously recorded, downloaded, burnt or transferred to a user equipment associated with the user).

The media guidance application may determine which specific data structure containing information about media assets that were previously stored by the user to access based on receiving an unique credential associated with the user (e.g., log-in information such as a string of characters or bio-metric data such as finger print, retina scan, voice recognition or another suitable bio-metric data) from the user. Alternatively, the media guidance application may receive an identifier associated with the user equipment on which the storing request is made and the media guidance application may determine the identity of the user by retrieving a user credential corresponding to the user equipment. The media guidance application may then access the user history table data structure associated with the identified user.

The media guidance application may determine whether a version of the media asset was previously stored by querying the data structure that contains information about media assets that were previously stored for the media asset. The media guidance application may retrieve an identifier for the media asset (e.g., media asset title, media asset serial code or any other suitable identifier) from metadata associated with the media asset. Additionally or alternatively, the media guidance application may access a database (e.g., a content rights management database) associated with the content source providing the media asset to determine an identifier for the media asset. The media guidance application may query, using database management languages (e.g., SQL, JAPQL, CODASYL or another suitable language), the data structure containing information about versions of media assets that were previously stored for media assets that are associated with the identifier for the media asset. For example, the media guidance application may use the media asset title "How I Met Your Mother, Series Finale" and SQL SELECT command to query the user history table associated with Tom's user profile to determine whether a version of the media asset "How I Met Your Mother, Series Finale" was previously recorded by Tom.

In some embodiments, the data structure containing information about previously stored media assets may be implemented on a cloud server and may contain information about media assets stored on multiple user equipment associated with the user. For example, user equipment DVR, tablet, and cell phone may be associated with the user Tom. For example, the user history table associated with Tom's user profile may be implemented on a cloud server and contain information about media assets stored on the DVR, tablet, and cell phone. In alternative embodiments, the data structure containing information about previously stored media assets may be implemented on a user equipment and may contain information about media assets stored on multiple user equipment associated with the user. For example, the user history table associated with Tom's user profile may be implemented on the DVR and contain information about media assets stored on the DVR, tablet, and cell phone. In alternative embodiments, the data structure containing information about previously stored media assets may be implemented locally on an user equipment and may contain information about media assets stored only on that user equipment. For example, the user history table associated with Tom's user profile may be implemented on the DVR and contain information about only media assets recorded on the DVR.

In some embodiments, the media guidance application may identify multiple user equipment associated with the profile of the user. For example, the media guidance application may access a registered devices data structure associated with Tom's user profile to determine that user equipment DVR, tablet, and cell phone are associated with the user Tom. The media guidance application may receive data about media assets that were previously stored by the user on each of the multiple user equipment. In some embodiments, the media guidance application may periodically query each of the user equipment associated with the profile of the user for information about media assets stored the user equipment. For example, the media guidance application may query a DVR associated with the user every twenty minutes for information about media assets recorded on the DVR. Additionally or alternatively, the media guidance application may automatically receive information about media assets stored each time a storing operation is initiated on any of the multiple user equipment associated with the profile of the user. For example, the media guidance application may automatically receive a notification each time a DVD burner burns a DVD.

The media guidance application may store, in the data structure associated with the profile of the user that contains information about the media assets that were previously stored by the user, the data. For example, the media guidance application may receive a notification that media asset "How I Met Your Mother, Series Finale" with characteristics "SD," "actual ending," and "Spanish sub-titles" was recorded on the tablet. The media guidance application may save this information as a record in the user history table data structure associated with Tom's user profile. The media guidance application may determine whether a version of the media asset was previously stored by accessing the data stored in the data structure associated with the profile of the user. For example, upon receiving a request to store the media asset "How I Met Your Mother, Series Finale," the media guidance application may retrieve the record corresponding the version of the media asset "How I Met Your Mother, Series Finale" stored on the tablet from the user history table data structure and determine that a version of the media asset "How I Met Your Mother, Series Finale" was previously recorded.

The media guidance application may, in response to determining that a version of the media asset was previously stored by the user, determine a characteristic associated with the version of the media asset that was previously stored. The characteristic can be but is not limited to program content (e.g., director's cut, inclusion of commercial, promotional content related to media asset, alternative ending), language options (e.g., language of sub-titles, language of dubbing, voice narration of content), audio support (e.g., Dolby Digital EX, Dolby Digital Surround EX, Dolby TrueHD), resolution (e.g., SD, HD, 4K), content rating (PG-13, R, U). The media guidance application may use a metadata extraction tool to parse metadata associated with the version of the media asset that was previously stored and extract the characteristic. Additionally or alternatively, the media guidance application may query the data structure containing information about media assets that were previously stored for a value associated with a field corresponding to the characteristic. For example, the media guidance application may query the user history table data structure associated with Tom's user profile for the value corresponding to the resolution field associated with the previously recorded version of "How I Met Your Mother, Series Finale" and the media guidance application may determine the characteristic to be SD.

The media guidance application may compare the characteristic associated with the version of the media asset that was previously stored with a corresponding characteristic associated with the media asset to identify a difference between the characteristic associated with the version of the media asset that was previously stored and the corresponding characteristic associated with the media asset. For example, the media guidance application may determine that the corresponding resolution characteristic associated with the requested media asset "How I Met Your Mother, Series Finale" is 4K. For example, the media guidance application may use a Boolean comparison operation to determine if the characteristic associated with the version of the media asset that was previously stored and the corresponding characteristic associated with the media asset are identical. Upon receiving a "identical=false" result from the comparison operation, the media guidance application may determine that there is a difference between the characteristic associated with the version of the media asset that was previously stored and the corresponding characteristic associated with the media asset. For example, the media guidance application may determine the difference in characteristic between the requested and previously recorded version of "How I Met Your Mother, Series Finale" is that the former has 4K resolution whereas the latter has SD resolution. The media guidance application may encapsulate the difference in a suitable format. As a non-limiting example, the media guidance application may encapsulate the difference by appending the characteristic associated with the version of the media asset that was previously stored to the corresponding characteristic associated with the media asset with a separator indicator in between (e.g., dash, comma, space or other suitable indicator). In this case, the media guidance application may determine the difference to be SD-4K (i.e., characteristic associated with the previously stored version-corresponding characteristic associated with the requested media asset).

The media guidance application may determine whether the difference is included in a database of pre-defined differences for which storing should be performed. For example, the media guidance application may query a database of pre-defined differences for which storing should be performed for the difference SD-4K. Manners in which the media guidance application may perform this query discussed previously are applicable here. In some embodiments, the database of pre-defined differences for which storing should be performed may be associated with the profile of the user. In some embodiments, the media guidance application may receive user selection of differences to be included in the database of pre-defined differences for which storing should be performed. In alternative embodiments, individual preferences for pre-defined differences may not be maintained and the database of pre-defined differences may contain default values for all users.

In some embodiments, media guidance application may dynamically update the database of pre-defined differences for which storing should be performed based on a user's media consumption habits. The media guidance application may monitor media consumption habits of the user. The media guidance application may determine, based on the user's media consumption habits, versions of media assets that are most preferred by the user. For example, the database of pre-defined differences for which storing should be performed may be associated with the user Tom. The media guidance application may monitor media assets viewed by Tom and track Tom's interactions with these various media assets. The media guidance application may extrapolate, from the data about Tom's media consumption habits (e.g., genre of media assets watched, fast-forwarding, rewinding, re-watching trends and other suitable data), that Tom prefers to watch media assets in the highest resolution available. The media guidance application may also determine that Tom never watches media assets with sub-titles and consequently, language of sub-titles is of little importance to Tom.

The media guidance application may then determine, based on versions of media assets that are most preferred by the user, differences for which storing should be performed. The media guidance application may store the differences in the database of pre-defined differences for which storing should be performed. For example, the media guidance application may determine that differences corresponding to the requested media asset having a higher resolution than the version that was previously stored should be included in the database of pre-defined differences for which storing should be performed. For example, the media guidance application may determine SD-HD, HD-4K and SD-4K as differences for which storing should be performed and save these differences in the database of pre-defined differences for which storing should be performed.

In come embodiments, the media guidance application may dynamically update the database of pre-defined differences for which storing should be performed based on available storage capacity on a user equipment on which the media asset is to be stored. The media guidance application may determine the user equipment on which the media asset is to be stored. The media guidance application may determine whether available storage capacity on the user equipment is less than a threshold storage capacity. For example, the media guidance application may determine, based on a user equipment identifier received with the store request, that the media asset "How I Met Your Mother, Series Finale" is to be recorded on the cell phone. The media guidance application may access a data structure associated the cell phone (e.g., device properties data structure) to determine the cell phone's available storage capacity. The media guidance application may access another data structure (e.g., parameters threshold values data structure) to determine the threshold storage capacity. The threshold storage capacity may be a fixed value (e.g., 100 MB) or a variable value determined based on the storage capacity required for storing the media asset (e.g., threshold storage capacity=storage capacity required for storing the media asset+pre-defined extra storage capacity).

The media guidance application may, in response to determining that the available storage capacity on the user equipment is less than the threshold storage capacity, assign priority values to the differences included in the database of pre-defined differences for which storing should be performed. For example, the media guidance application may determine that resolution is more important to the user Tom than language of sub-titles. Accordingly, the media guidance application may assign the resolution differences higher priority than language of sub-titles differences. For example, the media guidance application may assign SD-HD, HD-4K and SD-4K differences priority values of 10 and French sub-titles-English sub-titles priority values of 1. In some embodiments, the media guidance application may assign the priority values to the differences based on priority values corresponding to the differences received from the user. For example, the user may input, via a suitable interface, that the SD-HD difference should be assigned priority value 9 and HD-4K difference should be assigned priority value 10.

The media guidance application may remove differences that have a priority value lower than a threshold priority value from the database of pre-defined differences for which storing should be performed. For example, the media guidance application may retrieve the threshold priority value from a data structure (e.g., parameter threshold values data structure) and use a query function to determine which differences have associated priorities less than the threshold priority value. Manners in which the media guidance application may perform this query discussed previously are applicable here. For example, the media guidance application may determine that the threshold priority value is 5 and remove the French sub-titles-English sub-titles differences, which has a priority of 1, from the database of pre-defined differences.

The media guidance application may refrain from storing the media asset in response to determining that the difference is not included in the database of pre-defined differences for which storing should be performed. For example, the media guidance application may receive a request to store media asset "How I Met Your Mother, Series Finale" with characteristics SD and French sub-titles. The media guidance application may determine that the only difference between the requested version of "How I Met Your Mother, Series Finale" and the previously recorded version is a difference in language of sub-titles (i.e., Spanish sub-titles-French sub-titles), which is not included in the database of pre-defined differences for which storing should be performed. In this case, the media guidance application may refrain from recording the media asset "How I Met Your Mother, Series Finale" with characteristics SD and French sub-titles.

In some embodiments, the media guidance application may, further in response to determining that the difference is not included in the database of pre-defined differences, generate for display information about the version of the media asset that was previously stored along with a user selectable option to perform an action related to the version of the media asset that was previously stored. In the some embodiments, the user selectable option to perform an action related to the version of the media asset that was previously stored may be an option to override the decision to refrain from storing the requested media asset. In some embodiments, the user selectable option to perform an action related to the version of the media asset that was previously stored may be an option to transfer the version of the media asset that was previously stored from a first user equipment to a second user equipment. For example, upon refraining from recording media asset "How I Met Your Mother, Series Finale" with characteristics SD and French subtitles, the media guidance application may generate for display a prompt such as "A version of How I Met Your Mother, Series Finale was previously recorded" along with information about characteristics of the previously stored version (e.g., SD, actual ending, Spanish sub-titles). Additionally, the media guidance application may generate for display a notification that the requested media asset will not be stored (e.g., The requested media asset "How I Met Your Mother, Series Finale" will not be recorded). In some embodiments, media guidance application may generate for display a selectable option such as "override and store requested version" to receive from the user an indication that the media asset should be stored in spite of the existence of a previously stored version. Additionally or alternatively, the media guidance application may generate for display a selectable option such as "transfer previous version to a different device." In some instances, the media guidance application may generate for display the "transfer previous version to a different device" option upon determining that request to store was made on a different user equipment than the user equipment on which the previously stored version is stored.

The media guidance application may receive a selection of the user selectable option to perform the action related to the version of the media asset. The media guidance application may, upon receiving the selection, perform the action related to the version of the media asset. For example, the media guidance application receives a user selection of the "override and store requested version" option and in response, stores the media asset "How I Met Your Mother, Series Finale" with characteristics SD and French subtitles.

The media guidance application may, in response to determining that the difference is included in the database of pre-defined differences for which storing should be performed, store the media asset. For example, the media guidance application may receive a request to burn media asset "How I Met Your Mother, Series Finale" with characteristics 4K and alternative ending on to a BLU-RAY disc. The media guidance application may determine that the differences between the requested version of "How I Met Your Mother, Series Finale" and the previously stored version are a difference in resolution (i.e., SD-4K) and a difference in content (i.e., actual ending-alternative ending). The media guidance application may, upon determining that the difference in resolution (i.e., SD-4K) is included in the database of pre-defined differences for which storing should be performed, burn the media asset "How I Met Your Mother, Series Finale" with characteristics 4K and alternative ending on to a BLU-RAY disc.

In some embodiments, the media guidance application may, prior to storing the media asset, identify a user equipment on which the media asset is to be stored. The media guidance application may determine whether available storage capacity on the user equipment is less than a threshold storage capacity. The media guidance application may, in response to determining that the available storage capacity on the user equipment is less than the threshold storage capacity, determine whether the version of the media asset that was previously stored is also stored on the user equipment. The media guidance application may, in response to determining that the version of the media asset that was previously stored is also stored on the user equipment, free up storage capacity for storing the media asset by deleting the version of the media asset that was previously stored. Subsequent to freeing up storage capacity, the media guidance application may store the media asset on the user equipment.

For example, the media guidance application may determine that the media asset "How I Met Your Mother, Series Finale" is to be downloaded to Tom's cell phone and the cell phone's available storage capacity is less than the threshold capacity. Manners in which the media guidance application may perform this determination discussed previously are applicable here. The media guidance application may access the memory of the cell phone to determine whether the version of "How I Met Your Mother, Series Finale" previously stored is saved on the cell phone. Alternatively, the media guidance application may determine whether the previously stored version of "How I Met Your Mother, Series Finale" is saved on the cell phone by accessing the user history table data structure associated with Tom's user profile. Upon determining that that the previously stored version of "How I Met Your Mother, Series Finale" is saved on the cell phone, the media guidance application may delete the previously stored version of "How I Met Your Mother, Series Finale" from the cell phone's memory to free-up storage capacity. Upon deletion, the media guidance application may download the requested media asset "How I Met Your Mother, Series Finale" to the freed-up storage capacity on the cell-phone.

In some embodiments, the media guidance application may refrain from storing the media asset if the user equipment the media asset is to be stored on does not support the characteristic of the media asset. The media guidance application may, in response to determining that the difference is included in a database of pre-defined differences for which storing should be performed, identify a user equipment on which the media asset is to be stored. For example, the media guidance application may determine, in manners described previously, that a request to record the media asset "How I Met Your Mother, Series Finale" with characteristics 4K and alternative ending on Tom's cell phone has been received. The media guidance application may determine whether the user equipment supports playback of the media asset without loss of the characteristic. The media guidance application may, in response to determining that the user equipment does not support playback of the media asset without loss of the characteristic, refrain from storing the media asset on the user equipment. For example, the media guidance application may access a data structure associated with Tom's cell phone (e.g., device properties data structure) to determine the types of resolutions it supports. Upon determining that Tom's cell phone does not support 4K resolution, the media guidance application may refrain from recording media asset "How I Met Your Mother, Series Finale" with characteristics 4K and alternative ending on Tom's cell phone.

In some embodiments, the media guidance application, upon determining that the user equipment on the media asset is to be stored does not support playback of the media asset without loss of the characteristic, determines whether there is a second user equipment associated with the profile of the user that supports playback of the media asset without loss of the characteristic. The media guidance application may, in response to determining that there is a second user equipment that supports playback of the media asset without loss of the characteristic, store the media asset on the second user equipment. Following from the previous example, the media guidance application may, upon determining that Tom's cell phone does not support 4K resolution, access a data structure (e.g., registered devices data structure associated with Tom's user profile) to determine user equipment associated with Tom. The media guidance application may then access a data structure associated with each of the user equipment associated with Tom to determine whether any of the user equipment supports 4K resolution. For example, the media guidance application may determine that user equipment DVR associated with Tom supports 4K resolution. The media guidance application may record media asset "How I Met Your Mother, Series Finale" with characteristics 4K and alternative ending on Tom's DVR. As another example, the media guidance application may determine that a BLU-RAY burner is associated Tom and may instruct the BLU-RAY burner to burn the media asset "How I Met Your Mother, Series Finale" with characteristics 4K and alternative ending on to a BLU-RAY disc.

As the availability of media assets in different versions become more and more ubiquitous, it becomes increasingly important for media storage systems to selectively store different versions of a media asset that was previously stored in order to avoid having a detrimental impact on the user experience. Conventional media storage systems do not intelligently distinguish between the different versions of a media asset and consequently do not have the capability to selectively store certain requested media assets. Instead, Conventional media storage systems are limited to determining whether a version of the requested media asset was previously stored and basing the storing decision for the requested media asset solely on the result of that determination.

Systems and methods provided herein address this issue by identifying differences in characteristics between the requested media asset and the version of the requested media asset that was previously stored and basing the storing decision for the requested media asset on whether the identified difference renders the media asset more preferable to the user than the version previously requested. Consequently, the proposed systems and methods allow for more nuanced storing decisions by selectively storing only certain requested media assets.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 depicts an illustrative display that the media guidance application may present upon receiving a request to store a media asset that is less preferable than a version of the media asset that was previously stored by the user, in accordance with some embodiments of the disclosure;

FIG. 3 depicts an illustrative display that the media guidance application may present upon determining that a media asset should be stored but user equipment on which the media asset should be stored does not support the media asset, in accordance with some embodiments of the disclosure;

DETAILED DESCRIPTION

The described systems and methods enable selectively re-storing versions of a media asset that are preferable to a user over versions of the media asset that were previously stored. By doing so, these systems and methods prevents the user from wasting storage capacity by re-storing less preferred versions of media assets. These systems and methods, upon receiving a request to store a first version of a media from a user, determine whether a second version of the media asset was previously stored by the user. Upon determining that a second version of the media asset was stored by the user, these systems and methods determine whether the user prefers the second version to the first version. The systems and methods may determine which version is preferable by comparing a characteristic associated with the first version with a corresponding characteristic associated with the second version to determine a difference between the two versions. The systems and methods may then compare the determined difference in characteristic with entries in a list of pre-defined differences between the first version and the second version for which the first version should be stored to determine whether the user prefers the first version. The systems and methods, in response to determining that the user prefers the first version to the second version, store the first version. The systems and methods, in response to determining that the user prefers the second version, refrain from storing the first version.

Figure 1:
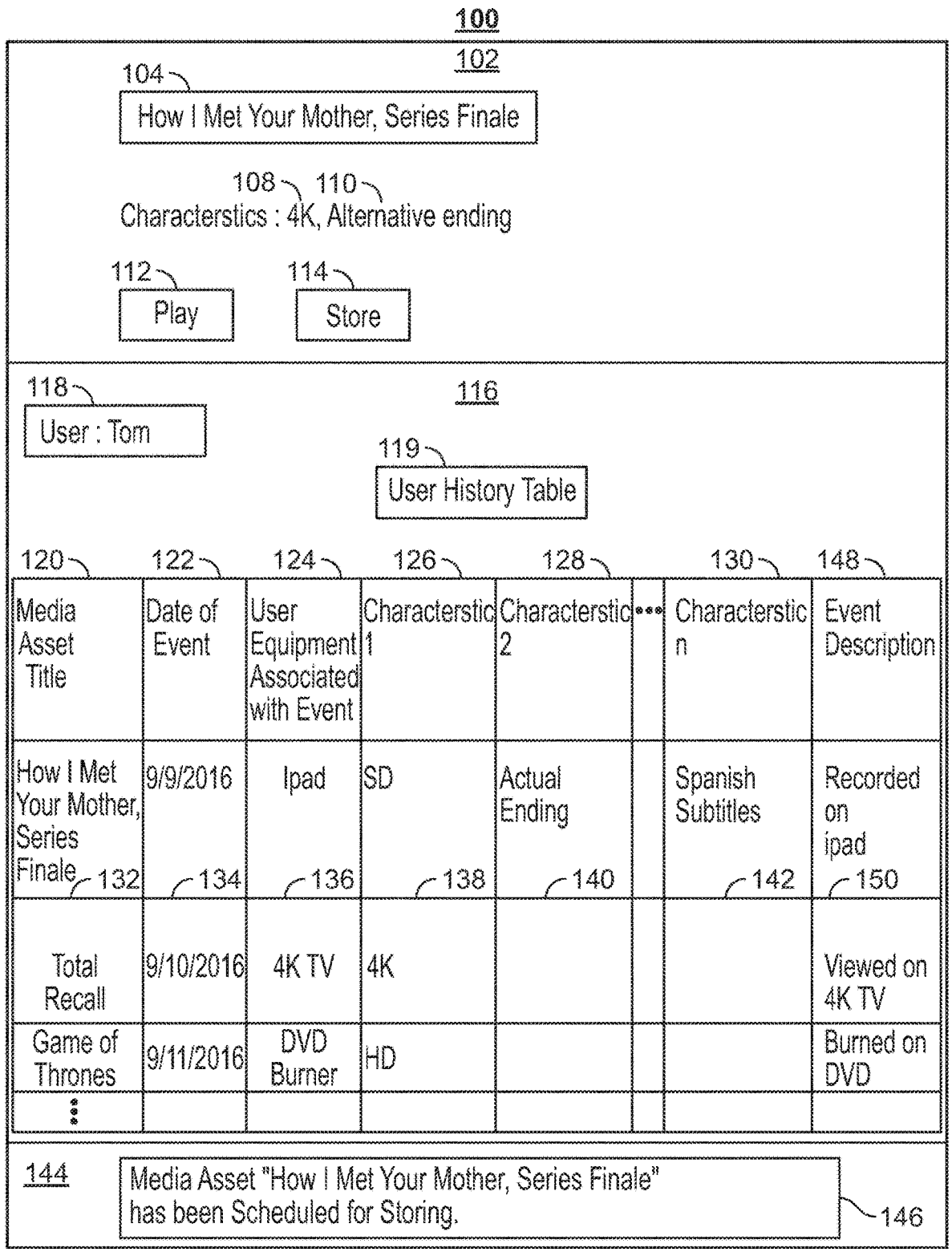
FIG. 1 depicts an illustrative display that the media guidance application may present upon receiving a request to store a media asset that is preferable to version of the media asset that was previously stored by the user, in accordance with some embodiments of the disclosure.

FIG. 1 depicts an illustrative display that the media guidance application may present upon receiving a request to store a media asset that is preferable to version of the media asset that was previously stored by the user, in accordance with some embodiments of the disclosure. FIG. 1 depicts an illustrative display 100, which may be presented by control circuitry that executes a media guidance application on any user equipment. The functionality of user equipment, control circuitry, and the media guidance application is described in further detail below with respect to FIGS. 4-7. Control circuitry may cause display 100 to be presented using the one or more of the processes described in FIGS. 8-10.

The media guidance application may generate for display a variety of displays, such as display 102, display 116 and display 144, on display 100. The media guidance application may generate for display an interface for receiving a user request to store a media asset, as depicted in display 102. The media guidance application may generate for display a media asset identifier 104 (e.g., a media asset identifier for "How I Met Your Mother, Series Finale") along with descriptions about characteristics associated with the media asset corresponding to media asset identifier 104. For example, the media guidance application may generate for a display resolution indicator 108 (e.g., 4K) and an ending indicator 110 (e.g., alternative ending). The media guidance application may also generate for display a selectable play option 112 and a selectable store option 114 for receiving a user request to perform a specific action related to the media asset corresponding to the media asset identifier 104.

In some aspects, the media guidance application may receive, from a user, a request to store a media asset. For example, the media guidance application may receive a request from a user to record the media asset corresponding to media asset identifier 104 (e.g., "How I Met Your Mother, Series Finale") upon receiving a selection of the selectable store option 114. The media guidance application may access a data structure, associated with a profile of the user, that contains information about media assets that were previously stored by the user to determine whether a version of the media asset was previously stored by the user. For example, the media guidance application may access a user history table data structure associated with Tom's user profile to determine whether a version of the media asset "How I Met Your Mother, Series Finale" was previously stored.

As referred to herein, "store" should be understood to mean any methods or systems (e.g., recording, downloading, transferring, burning) for preserving a media asset persistently, such that a user can access the media asset after its original transmission. In some embodiments, storing a media asset may be performed by user equipment recording the media asset from the content source transmitting the media asset (e.g., recording a media asset on a DVR). In other embodiments, storing a media asset may be performed by downloading a copy of the media asset from a remote server via a communications network (e.g., downloading a media asset from content provider YouTube). In other embodiments, storing a media asset may be performed by transferring a copy of the media asset from one user equipment to another (e.g., transferring a media asset from DVR to tablet). In some embodiments, storing a media asset may be performed by burning the media asset on to a storage device (e.g., burning a media asset on to a DVD). Any other manner of storing a media asset is within the scope of the term "store" as used herein.

The media guidance application may determine which specific data structure containing information about media assets that were previously stored by the user to access based on receiving an unique credential associated with the user (e.g., log-in information such as a string of characters or bio-metric data such as finger print, retina scan, voice recognition or another suitable bio-metric data) from the user. Alternatively, the media guidance application may receive an identifier associated with the user equipment on which the storing request is made and the media guidance application may determine the identity of the user by retrieving a user credential corresponding to the user equipment. The media guidance application may then access the user history table data structure associated with the identified user.

The media guidance application may generate for display 116 to present information about media assets that were previously stored to by the user. The media guidance application may present, in display 116, a user identifier 118 (e.g., user: Tom) and a table 119 (e.g., user history table) containing information about media assets that were previously stored. Each entry in table 119 may constitute several fields that provide descriptive information about a particular stored media asset. Exemplary fields include but are not limited to media asset title 120, date of event 122, user equipment associated with event 124, multiple characteristics (e.g., characteristic 1 126, characteristic 2 128, characteristic n 130) and event description 148. An example entry in table 119 may comprise of a media asset title value 132 (e.g., "How I Met Your Mother, Series Finale"), a date of event value 134 (e.g., Sep. 9, 2016), a device stored on value 136 (e.g., iPAD), a resolution value 138 (e.g., SD) corresponding to characteristic 1 126, an ending value 140 (e.g., actual ending) corresponding to characteristic 2 128, a sub-title language value 142 (e.g., Spanish sub-titles) corresponding to characteristic n 130 and event description value 150 corresponding to event description 148. Although the depicted data structure containing information about media assets that were previously stored by the user comprises a table, it is only an illustrative embodiment. Information about media assets that were previously stored can stored and presented using another suitable data storage structures (e.g., linked lists, arrays) without departing from the scope of this invention.

The data structure containing information about media assets that were previously stored by the user may contain information about media assets stored by the user on user equipment and remote server associated with the user. The media guidance application may determine whether a version of the media asset was previously stored by querying the data structure that contains information about media assets that were previously stored by the user for the media asset. The media guidance application may retrieve an identifier for the media asset (e.g., media asset title, media asset serial code or any other suitable identifier) from metadata associated with the media asset. Additionally or alternatively, the media guidance application may access a database (e.g., a content rights management database) associated with the content source providing the media asset to determine an identifier for the media asset. The media guidance application may query, using database management languages (e.g., SQL, JAPQL, CODASYL or another suitable language), the data structure containing information about versions of media assets that were previously stored for media assets that are associated with the identifier for the media asset. For example, the media guidance application may use the media asset identifier 104 (e.g., "How I Met Your Mother, Series Finale") and SQL SELECT command to query table 119 associated with the profile of the user to determine whether a version of the media asset corresponding to media asset identifier 104 was previously recorded by the user.

In some embodiments, the media guidance application may access a data structure containing information about previously stored (e.g., recorded, burned, downloaded, transferred) media assets that is implemented on a cloud server. The data structure may contain information about media assets stored on multiple user equipment associated with the user. For example, table 119 associated with the profile of the user (e.g., Tom's user profile) may be implemented on a cloud server and contain information about media assets stored on user equipment (e.g., DVR, tablet, and cell phone) associated with the user. In alternative embodiments, the media guidance application may access a data structure, containing information about previously stored media assets, that is implemented on a user equipment and contains information about media assets stored on multiple user equipment associated with the user. For example, the media guidance application may access table 119 associated with Tom's user profile that is implemented on user equipment DVR and contains information about media assets stored on DVR, tablet, and cell phone.

In alternative embodiments, the media guidance application may access a data structure containing information about previously stored media assets that is implemented locally on a user equipment and contains information about media assets stored only on that user equipment. For example, the media guidance application may access table 119, associated with Tom's user profile, that is implemented on a DVR associated with Tom and contains information about only media assets recorded on the DVR.

In some embodiments, the media guidance application may identify multiple user equipment associated with the profile of the user. For example, the media guidance application may access a registered devices data structure associated with Tom's user profile, located at any of the storage locations described in further detail below with respect to FIG. 6-7, to determine that user equipment DVR, tablet, and cell phone are associated with the user Tom. The media guidance application may receive data about media assets that were previously stored by the user on each of the multiple user equipment. As referred to herein, a media asset stored on a user equipment should be understood to mean that the media asset is stored on a storage component that is accessible to the user equipment. The storage component could be part of the user equipment itself or a remote server. The remote server can be accessed by all of the user equipment associated with the user. In some embodiments, the media guidance application may receive data about media assets that were previously stored by the user directly on a remote server. In some embodiments, the media guidance application may periodically query each of the user equipment associated with the profile of the user for information about media assets stored by the user equipment. Additionally or alternatively, the media guidance application may automatically receive information about media assets stored each time a storing operation is initiated on any of the multiple user equipment associated with the profile of the user.

The media guidance application may store, in the data structure associated with the profile of the user that contains information about the media assets that were previously stored by the user, the data. For example, the media guidance application may receive a notification that media asset "How I Met Your Mother, Series Finale" with characteristics SD, actual ending, and Spanish sub-titles was recorded on a tablet (e.g., iPAD) on Sep. 9, 2016. The media guidance application may save this information as an entry in table 119 associated with the profile of the user. The media guidance application may determine whether a version of the media asset was previously stored by accessing the data stored in the data structure associated with the profile of the user. For example, upon receiving a request to record the media asset corresponding to media asset identifier 104 (e.g., "How I Met Your Mother, Series Finale"), via user selection of selectable store option 114, the media guidance application may retrieve the entry associated with media asset title value 132 and determine that a version of the media asset corresponding to media asset identifier 104 was previously recorded by the user.

The media guidance application may, in response to determining that a version of the media asset was previously stored by the user, determine a characteristic associated with the version of the media asset that was previously stored. The characteristic can be but is not limited to program content (e.g., director's cut, inclusion of commercial, promotional content related to media asset, alternative ending), language options (e.g., language of sub-titles, language of dubbing, voice narration of content), audio support (e.g., Dolby Digital EX, Dolby Digital Surround EX, Dolby TrueHD), resolution (e.g., SD, HD, 4K), content rating (PG-13, R, U). The media guidance application may use a metadata extraction tool to parse metadata associated with the version of the media asset that was previously stored and extract the characteristic. Additionally or alternatively, the media guidance application may query the data structure containing information about media assets that were previously stored for a value associated with a field corresponding to the characteristic. For example, the media guidance application may query table 119 associated with the profile of the user for the value corresponding to the resolution characteristic associated with the previously stored version of the media asset corresponding to media asset identifier 104. The media guidance application may determine the characteristic to be resolution value 138 (e.g., SD).

The media guidance application may compare the characteristic associated with the version of the media asset that was previously stored with a corresponding characteristic associated with the media asset to identify a difference between the characteristic associated with the version of the media asset that was previously stored and the corresponding characteristic associated with the media asset. For example, the media guidance application may determine that the corresponding resolution characteristic associated with the media asset corresponding to media asset identifier 104 is resolution indicator 108. The media guidance application may use a Boolean comparison operation to determine if the characteristic associated with the version of the media asset that was previously recorded and the corresponding characteristic associated with the media asset are identical. Upon receiving a "identical=false" result from the comparison operation, the media guidance application may determine that there is a difference between the characteristic associated with the version of the media asset that was previously stored and the corresponding characteristic associated with the media asset. For example, the media guidance application may determine the difference in characteristic between the requested and previously stored version of "How I Met Your Mother, Series Finale" is that the former has 4K resolution whereas the latter has SD resolution. The media guidance application may encapsulate the difference in a suitable format. As a non-limiting example, the media guidance application may encapsulate the difference by appending the characteristic associated with the version of the media asset that was previously stored to the corresponding characteristic associated with the media asset with a separator indicator in between (e.g., dash, comma, space or other suitable indicator). In this case, the media guidance application may determine the difference to be SD-4K (i.e., characteristic associated with the previously stored version-corresponding characteristic associated with the requested media asset).

The media guidance application may determine whether the difference is included in a database of pre-defined differences for which storing should be performed. For example, the media guidance application may query a database of pre-defined differences for which storing should be performed, located at any of the storage locations described in further detail below with respect to FIG. 6-7, for the difference SD-4K. Manners in which the media guidance application may perform this query discussed previously are applicable here. In some embodiments, the database of pre-defined differences for which storing should be performed may be associated with the profile of the user. In some embodiments, the media guidance application may receive user selection of differences to be included in the database of pre-defined differences for which storing should be performed. In alternative embodiments, individual preferences for pre-defined differences may not be maintained and the database of pre-defined differences may contain default values for all users.

In some embodiments, the media guidance application may dynamically update the database of pre-defined differences for which storing should be performed based on a user's media consumption habits. The media guidance application may monitor media consumption habits of the user. The media guidance application may determine, based on the user's media consumption habits, versions of media assets that are most preferred by the user. For example, the database of pre-defined differences for which storing should be performed may be associated with the user Tom. The media guidance application may monitor media assets viewed by Tom and track Tom's interactions with these various media assets. The media guidance application may extrapolate, from the data about Tom's media consumption habits (e.g., genre of media assets watched, fast-forwarding, rewinding, re-watching trends and other suitable data), that Tom prefers to watch media assets in the highest resolution available. The media guidance application may also determine that Tom never watches media assets with sub-titles and consequently, language of sub-titles is of little importance to Tom.

The media guidance application may then determine, based on versions of media assets that are most preferred by the user, differences for which storing should be performed. The media guidance application may store the differences in the database of pre-defined differences for which storing should be performed. For example, the media guidance application may determine that differences corresponding to the requested media asset having a higher resolution than the version that was previously stored should be included in the database of pre-defined differences for which storing should be performed. For example, the media guidance application may determine SD-HD, HD-4K and SD-4K as differences for which storing should be performed and save these differences in the database of pre-defined differences for which storing should be performed.

In some embodiments, the media guidance application may dynamically update the database of pre-defined differences for which storing should be performed based on available storage capacity on a user equipment on which the media asset is to be stored. In some embodiments, the media guidance application may dynamically update the database of pre-defined differences for which storing should be performed based on available storage capacity on a remote server on which the media asset is to be stored. The media guidance application may determine the user equipment on which the media asset is to be stored. The media guidance application may determine whether available storage capacity on the user equipment is less than a threshold storage capacity. For example, the media guidance application may determine, based on a user equipment identifier received with the store request, that the media asset corresponding to media asset identifier 104 is to be downloaded on the cell phone. The media guidance application may access a data structure associated the cell phone (e.g., device properties data structure) to determine the cell phone's available storage capacity. The media guidance application may access another data structure (e.g., parameters threshold values data structure) to determine the threshold storage capacity. The threshold storage capacity may be a fixed value (e.g., 100 MB) or a variable value determined based on the storage capacity required for storing the media asset (e.g., threshold storage capacity=storage capacity required for storing the media asset+pre-defined extra storage capacity).

The media guidance application may, in response to determining that the available storage capacity on the user equipment is less than the threshold storage capacity, assign priority values to the differences included in the database of pre-defined differences for which storing should be performed. For example, the media guidance application may determine that resolution is more important to the user Tom than language of sub-titles. Accordingly, the media guidance application may assign the resolution differences higher priority than language of sub-titles differences. For example, the media guidance application may assign SD-HD, HD-4K and SD-4K differences priority values of 10 and French sub-titles-English sub-titles priority values of 1. In some embodiments, the media guidance application may assign the priority values to the differences based on priority values corresponding to the differences received from the user. For example, the user may input, via a suitable interface, that the SD-HD difference should be assigned priority value 9 and HD-4K difference should be assigned priority value 10.

The media guidance application may remove differences that have a priority value lower than a threshold priority value from the database of pre-defined differences for which storing should be performed. For example, the media guidance application may retrieve the threshold priority value from a data structure (e.g., parameter threshold values data structure) and use a query function to determine which differences have associated priorities less than the threshold priority value. Manners in which the media guidance application may perform this query discussed previously are applicable here. For example, the media guidance application may determine that the threshold priority value is 5 and remove the French sub-titles-English sub-titles differences, which has a priority of 1, from the database of pre-defined differences.

The media guidance application may, in response to determining that the difference is included in the database of pre-defined differences for which storing should be performed, store the media asset. For example, the media guidance application may receive a request to burn media asset corresponding to media asset identifier 104 (e.g., "How I Met Your Mother, Series Finale" with characteristics 4K and alternative ending) on to a BLU-RAY disc. In this example, the media guidance application may determine that the differences between the requested version of "How I Met Your Mother, Series Finale" and the previously stored version are a difference in resolution (i.e., SD-4K) and a difference in content (i.e., actual ending-alternative ending). The media guidance application may, upon determining that the difference in resolution (i.e., SD-4K) is included in the database of pre-defined differences for which storing should be performed, burn the media asset corresponding to media asset identifier 104 onto a BLU-RAY disc.

The media guidance application may, upon determining that the difference is included in the database of pre-defined differences for which storing should be performed, generate for display display 144. The media guidance application may present in display 144 notification 146 that informs the user that the media asset corresponding to media asset identifier 104 has been scheduled for storing (e.g., "Media asset 'How I Met Your Mother, Series Finale' has been scheduled for storing").

In some embodiments, the media guidance application may, prior to storing the media asset, identify a user equipment on which the media asset is to be stored. The media guidance application may determine whether available storage capacity on the user equipment is less than a threshold storage capacity. The media guidance application may, in response to determining that the available storage capacity on the user equipment is less than the threshold storage capacity, determine whether the version of the media asset that was previously stored is also stored on the user equipment. The media guidance application may, in response to determining that the version of the media asset that was previously stored is also stored on the user equipment, free up storage capacity for storing the media asset by deleting the version of the media asset that was previously stored. Subsequent to freeing up storage capacity, the media guidance application may store the media asset on the user equipment. In some embodiments, the media guidance application may similarly free up space on a remote server and store the media asset on the remote server.

For example, the media guidance application may determine that the media asset corresponding to media asset identifier 104 (e.g., "How I Met Your Mother, Series Finale") is to be recorded on Tom's cell phone and the cell phone's available storage capacity is less than the threshold capacity. Manners in which the media guidance application may perform this determination discussed previously are applicable here. The media guidance application may access the memory of the cell phone to determine whether the version of the media asset corresponding to media asset identifier 104 that was previously stored is saved on the cell phone. Alternatively, the media guidance application may determine whether the previously stored version of the media asset corresponding to media asset identifier 104 is saved on the cell phone by accessing table 119 associated with Tom's user profile. Upon determining that that the previously stored version of the media asset corresponding to media asset asset identifier 104 is saved on the cell phone, the media guidance application may delete the previously stored version of the media asset corresponding to media asset identifier 104 from the cell phone memory to free-up storage capacity. Upon deletion, the media guidance application may record the requested media asset corresponding to the media asset identifier 104 to the freed-up storage capacity on the cell-phone.

FIG. 2 depicts an illustrative display that the media guidance application may present upon receiving a request to store a media asset that is less preferable than a version of the media asset that was previously stored by the user, in accordance with some embodiments of the disclosure. FIG. 2 depicts an illustrative display 200, which may be presented by control circuitry that executes a media guidance on any user equipment. The functionality of user equipment, control circuitry, and the media guidance application is described in further detail below with respect to FIGS. 4-7. Control circuitry may cause display 200 to be presented using the one or more of the processes described in FIGS. 8-10.

The media guidance application may generate for display an interface for receiving a user request to store a media asset, as depicted in display 202. The media guidance application may present, in display 202, media asset identifier 204 along with descriptions about characteristics associated with the media asset corresponding to media asset identifier 204 (e.g., "How I Met Your Mother, Series Finale"). For example, the media guidance application may generate for display resolution indicator 208 (e.g., SD) and sub-title language indicator 210 (e.g., French Sub-titles). The media guidance application may also generate for display selectable play option 212 and selectable store option 214 for receiving user request to perform a specific action related to the media asset corresponding to the media asset identifier 204.

The media guidance application may generate for display display 216 upon determining that the difference in characteristic between the requested media asset and the version previously stored is not included in the database of pre-defined differences for which storing should be performed. The media guidance application may refrain from storing the media asset in response to determining that the difference is not included in the database of pre-defined differences for which storing should be performed. For example, the media guidance application may receive a request to record the media asset corresponding to media asset identifier 204 (e.g., "How I Met Your Mother, Series Finale" with characteristics SD and French sub-titles). The media guidance application may determine that the only difference between the media asset corresponding to media asset identifier 204 and the version of the media asset previously stored is a difference that is not included in the database of pre-defined differences for which storing should be performed. For example, the media guidance application may determine that the only difference between the requested version of "How I Met Your Mother, Series Finale" and the previously stored version is a difference in language of sub-titles (i.e., Spanish sub-titles-French sub-titles), which is not included in the database of pre-defined differences for which storing should be performed. In this case, the media guidance application may refrain from recording the media asset corresponding to media asset identifier 204.

In some embodiments, the media guidance application may, further in response to determining that the difference is not included in the database of pre-defined differences, generate for display information about the version of the media asset that was previously stored along with a user selectable option to perform an action related to the version of the media asset that was previously stored. In the some embodiments, the user selectable option to perform an action related to the version of the media asset that was previously stored may be an option to override the decision to refrain from storing the requested media asset. In some embodiments, the user selectable option to perform an action related to the version of the media asset that was previously stored may be an option to transfer the version of the media asset that was previously stored from a first user equipment to a second user equipment. For example, upon refraining from recording media asset corresponding to media asset identifier 204, the media guidance application may generate for display notification 218 (e.g., "A version of How I Met Your Mother, Series Finale was previously stored") to inform the user that another version of the media asset was previously recorded. Additionally, the media guidance application may generate for display notification 220 to provide information about the version of the media asset that was previously stored. The media guidance application may include in notification 220 resolution indicator 222 (e.g., SD), ending indicator 224 (e.g., actual ending) and sub-title language indicator 226 (e.g., Spanish sub-titles).

Additionally or alternatively, the media guidance application may generate for display notification 228 to inform the user the requested media asset will not be stored (e.g., "The requested media asset 'How I Met Your Mother, Series Finale' will not be stored"). In some embodiments, media guidance application may generate for display selectable override option 230 (e.g., "override and store requested version") to receive user input regarding whether the media asset should be stored in spite of the existence of a previously stored version. Additionally or alternatively, the media guidance application may generate for display selectable transfer option 232 (e.g., "transfer previous version to a different device"). In some instances, the media guidance application may present selectable transfer option 232 upon determining that request to store was made on a different user equipment than the user equipment on which the previously stored version is stored.

The media guidance application may receive a selection of the user selectable option to perform the action related to the version of the media asset. The media guidance application may, upon receiving the selection, perform the action related to the version of the media asset. For example, the media guidance application receives a user selection of selectable override option 230 and in response, stores the media asset corresponding to media asset identifier 204.

In some embodiments, the media guidance application may receive a request to burn the media asset corresponding to media asset identifier 204 to a storage device (e.g., CD, DVD, BLU-RAY discs and other suitable storage devices). The media guidance application may access table 119 to determine whether a version of the media asset corresponding to media asset identifier 204 was previously stored. Upon determining that a version of the media asset corresponding to media asset identifier 204 was previously stored, the media guidance application may access a database of pre-defined differences for which storing should be performed to determine whether the media asset corresponding to media asset identifier 204 should be burned to the requested storage device.

As an illustrative example, the media guidance application may determine that the version previously burned is more preferable to the user than the media asset corresponding to media asset identifier 204. In this case, the media guidance application may display a notification to inform the user of the existence of the version of the media asset corresponding to media asset identifier 204 that was previously burned. The media guidance application may include in the notification details about date the burning operation was performed, storage device to which the version was burned and details about the version burned. For example, the media guidance application may display a notification such as "A version of 'How I Met Your Mother, Series Finale' was previously burned on Sep. 9, 2016 on DVD-R. Do you still want to burn the requested 'How I Met Your Mother, Series Finale'?"

In some embodiments, the media guidance application may receive a request to burn media assets to a storage device that does not support characteristics of the media asset. The media guidance application may refrain from burning the media asset to the requested user equipment upon determining that the requested storage device does not support the characteristics of the media asset. For example, the media guidance application may receive a request to burn a 4K resolution video on a DVD-R. The media guidance application may access a data structure (e.g., device properties data structure) associated with the DVD-R to determine the types of resolutions the DVD-R supports. Upon determining that the DVD-R does not support 4K resolution video, the media guidance application may refrain from burning the 4K resolution video on a DVD-R. In some embodiments, the media guidance application may determine an alternative storage device associated with the user that supports characteristics of the media asset. In some embodiments, the media guidance application may notify the user of the existence of the alternative storage device. For example, the media guidance application may generate for display notification "DVD-R does not support 4K videos. Burn on your BLU-RAY discs instead." In some embodiments, the media guidance application may automatically burn the video on the alternative storage device associated with the user that supports characteristics of the media asset.

In some embodiments, the media guidance application may receive a request to view a media asset. The media guidance application may determine whether a more preferred version of the media asset was previously stored. Upon determining a more preferred version of the media asset was previously stored, the media guidance application may generate for display a recommendation to the user to view the more preferred version that was previously stored. For example, the media guidance application may receive a request to view the media asset corresponding to media asset identifier 204. The media guidance application may access table 119 to determine whether a version of the media asset corresponding to media asset identifier 204 was previously stored. Upon determining that a version of the media asset corresponding to media asset identifier 204 was previously stored, the media guidance application may access a database of pre-defined differences indicating more preferred versions to determine whether the version of the media asset corresponding to media asset identifier 204 that was previously stored is the more preferred version. Manners in which the media guidance application may perform this determination discussed previously are applicable here.

As an illustrative example, the media guidance application may receive a request from the user to view "How I Met Your Mother, Series Finale" with SD resolution. The media guidance application may determine that "How I Met Your Mother, Series Finale" with 4K resolution was previously stored by the user. In response, the media guidance application may generate for display a notification "You have previously stored 'How I Met Your Mother, Series Finale' with 4K resolution. Do you want to watch the stored version instead?" In some embodiments, the media guidance application may also generate for display a notification recommending a user equipment associated with the profile of the user on which to view the more preferred version of the media asset that was previously recorded. For example, the media guidance application may generate for display the notification "Viewing 'How I Met Your Mother, Series Finale' with 4K resolution on the 4K TV is recommended." In some embodiments, the media guidance application may generate for display the recommendation for which user equipment to view the he more preferred version of the media asset that was previously recorded based on determining that user equipment on which the user has requested to view the media asset does not support playback of the media asset without loss of characteristics.

In some embodiments, the media guidance application may include information about versions of media assets that were previously viewed by the user in table 119. For example, the media guidance application may detect that a user viewed a version of media asset "Total Recall" with 4K resolution on 4K TV on Sep. 11, 2016 and save this as a record in table 119. The media guidance application may, upon receiving a request to view a media asset, access table 119 to determine whether a version of the media asset was previously viewed. The media guidance application may provide recommendations based on characteristics associated with the version of the media asset previously viewed. From the previous example, the media guidance application may receive, at a later point in time, a request to view "Total Recall" with SD resolution. The media guidance application may generate for display a notification such as "You have previously viewed 'Total Recall' with 4K resolution. Do you want to view again?"

In some embodiments, the media guidance application may determine whether the user prefers the version of the media asset previously viewed more than the requested version of the media asset. Manners in which the media guidance application may perform this determination discussed previously is applicable here. In some embodiments, the media guidance application may generate for display the notification informing the user about the version of the media asset previously viewed in response to determining that the user prefers the version of the media asset that was previously viewed. In some embodiments, the media guidance application may receive a request to a view a media asset that was previously viewed and provide a recommendation for a user equipment on which to view the media asset on. For example, the media guidance application may receive a request to view "Total Recall" with 4K resolution on a tablet. The media guidance application may determine, from table 119, that "Total Recall" with SD resolution was previously viewed on a cell phone. In this case, the media guidance application may provide the recommendation to view the requested media asset on 4K television (e.g., "You have previously viewed 'Total Recall' SD version on a cell phone. Requested version of 'Total Recall' has 4K resolution. Watching on your 4K TV is recommended.").

FIG. 3 depicts an illustrative display that the media guidance application may present upon determining that a media asset should be stored but user equipment on which the media asset should be stored does not support the media asset, in accordance with some embodiments of the disclosure. FIG. 3 depicts an illustrative display 300, which may be presented by control circuitry that executes a media guidance on a user equipment. The functionality of user equipment, control circuitry, and the media guidance application is described in further detail below with respect to FIGS. 4-7. Control circuitry may cause display 300 to be presented using the one or more of the processes described in FIGS. 8-10.

The media guidance application may generate for display, upon determining that the user equipment the media asset is to be stored on does not support the characteristic of the media asset, display 300. The media guidance application may, in response to determining that the difference is included in a database of pre-defined differences for which storing should be performed, identify a user equipment on which the media asset is to be stored. For example, the media guidance application may determine, in manners described previously, that a request to record the media asset on user equipment 304 (e.g., cell phone) has been received. As an example, the media asset may be "How I Met Your Mother, Series Finale" with characteristics 4K and alternative ending. The media guidance application may generate for display prompt 302 to inform the user that the request has been received. The media guidance application may determine whether the user equipment supports playback of the media asset without loss of the characteristic. The media guidance application may, in response to determining that the user equipment does not support playback of the media asset without loss of the characteristic, refrain from storing the media asset on the user equipment.

For example, the media guidance application may access a data structure (e.g., device properties data structure) associated with user equipment 304 to determine the types of resolutions it supports. Upon determining that user equipment 304 does not support the 4K resolution, the media guidance application may refrain from storing media asset on user equipment 304. The media guidance application may display notification 306 to inform the user that the user equipment does not support the requested version of the media asset (e.g., "Your cell phone does not support 4K videos"). The media guidance application may also generate for display notification 308 to inform the user that a storage operation was not performed (e.g., "The requested version of 'How I Met Your Mother, Series Finale' will not be stored").

In some embodiments, the media guidance application, upon determining that the user equipment on the media asset is to be stored does not support playback of the media asset without loss of the characteristic, determines whether there is a second user equipment associated with the profile of the user that supports playback of the media asset without loss of the characteristic. The media guidance application may, in response to determining that there is a second user equipment that supports playback of the media asset without loss of the characteristic, store the media asset on the second user equipment. In alternative embodiments, the media guidance application may store the media asset on a remote server that the second user equipment has access to.

Following from the previous example, the media guidance application may, upon determining that user equipment 304 does not support 4K resolution, access a data structure (e.g., registered devices data structure associated with Tom's user profile) to determine other user equipment associated with Tom. The media guidance application may then access a data structure associated with each of the user equipment associated with Tom to determine whether any of the user equipment supports 4K resolution. For example, the media guidance application may determine that user equipment 312 (e.g., DVR) associated with user supports 4K resolution. The media guidance application may display notification 310 ("Your DVR supports 4K videos") informing the user of the availability of another device that supports the requested media asset.

In some embodiments, the media guidance application may generate for display user selectable store option 314 (e.g., Store on DVR) to receive user input regarding whether to store the requested media asset on the other device that supports the requested media asset. Upon receiving user selection of selectable store option 314, the media guidance application may store media asset on user equipment 312. In some embodiments, upon receiving user selection of selectable store option 314, the media guidance application may store media asset on a remote server that is accessible to user equipment 312. For example, the media guidance application may determine that the user's 4K television supports 4K resolution. In this case, the media guidance application may store the media asset on a cloud DVR that is associated with the 4K television.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be stored, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 4:
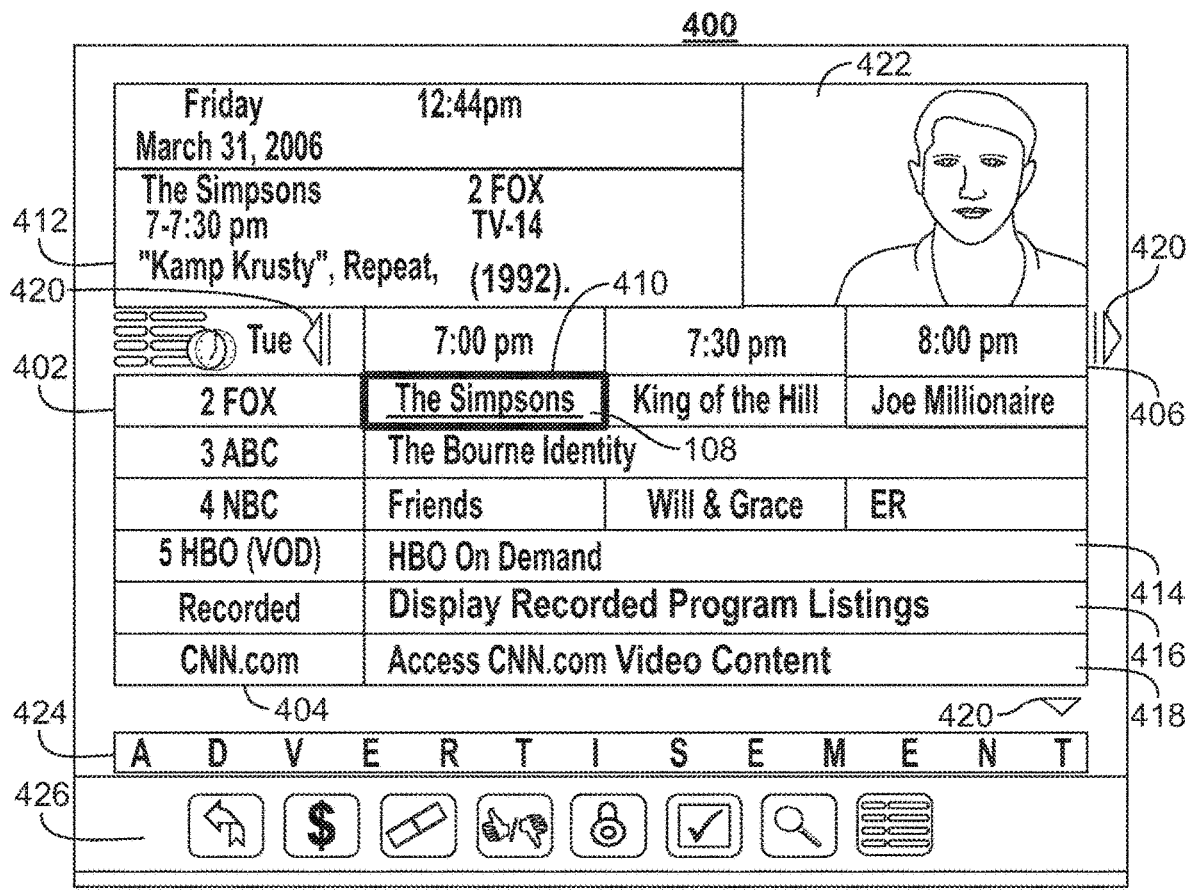
FIG. 4 shows an illustrative embodiment of a display screen that may be used to provide media guidance application listings and other media guidance information, in accordance with some embodiments of the disclosure.
Figure 5:
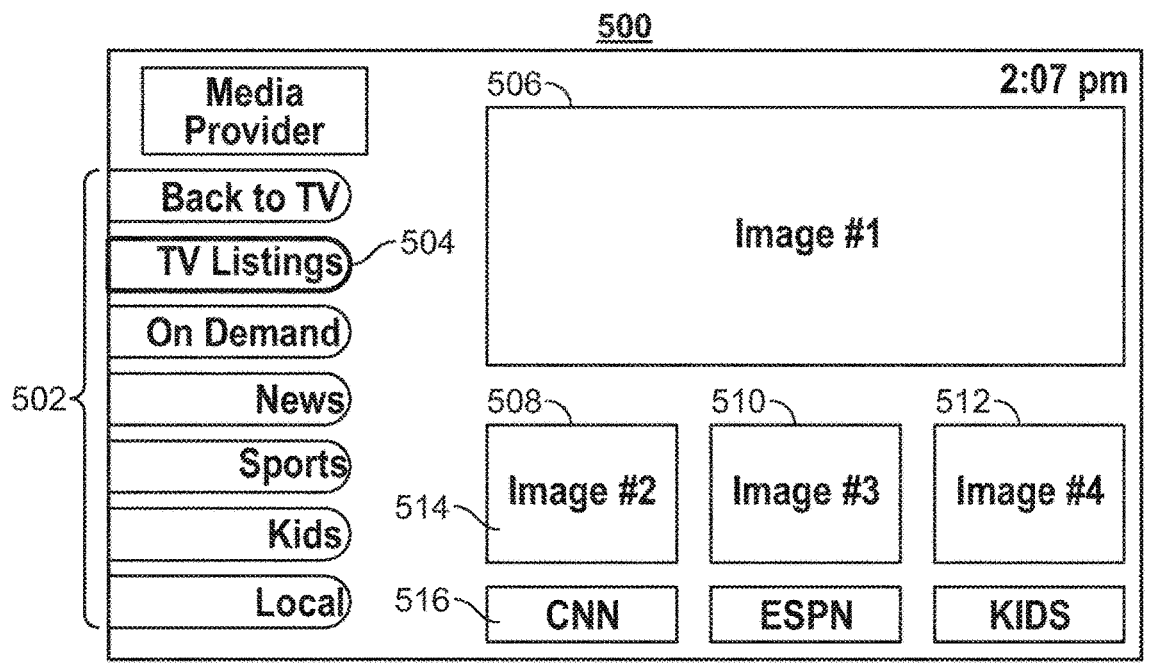
FIG. 5 shows another illustrative embodiment of a display screen that may be used to provide media guidance application listings, in accordance with some embodiments of the disclosure.

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, advertisement 424, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 424 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 402. Advertisement 424 may also be for products or services related or unrelated to the content displayed in grid 402. Advertisement 424 may be selectable and provide further information about content, provide information about a product or a service, enable purchasing of content, a product, or a service, provide content relating to the advertisement, etc. Advertisement 424 may be targeted based on a user's profile/preferences, monitored user activity, the type of display provided, or on other suitable targeted advertisement bases.

While advertisement 424 is shown as rectangular or banner shaped, advertisements may be provided in any suitable size, shape, and location in a guidance application display. For example, advertisement 424 may be provided as a rectangular shape that is horizontally adjacent to grid 402. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
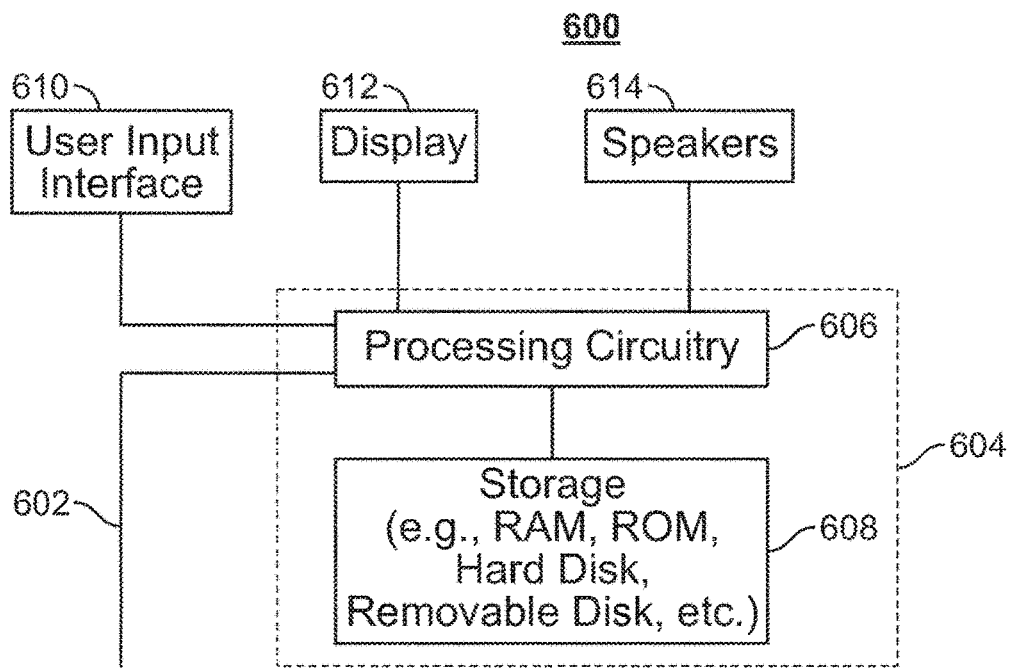
FIG. 6 is a block diagram of an illustrative user equipment (UE) device in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
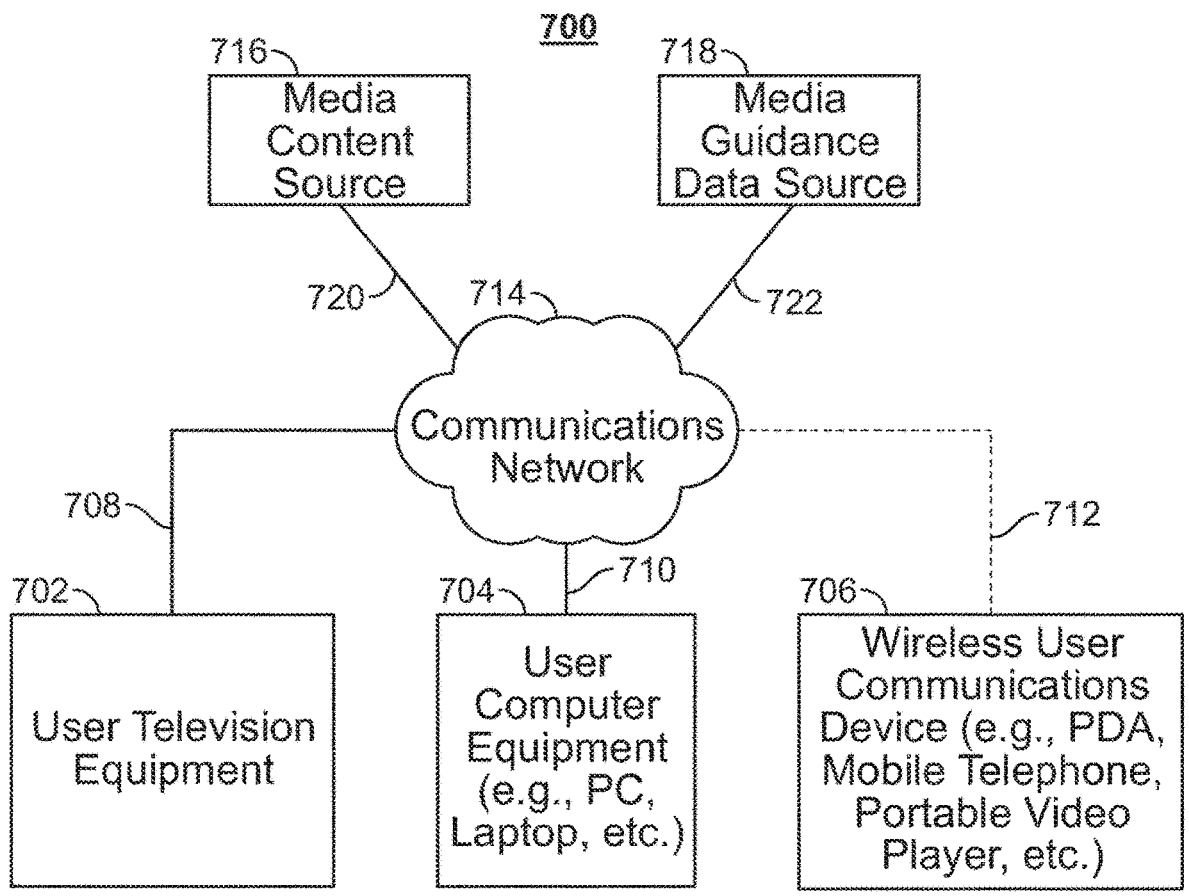
FIG. 7 is a block diagram of an illustrative media system in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some user television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application via a web site via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 8:
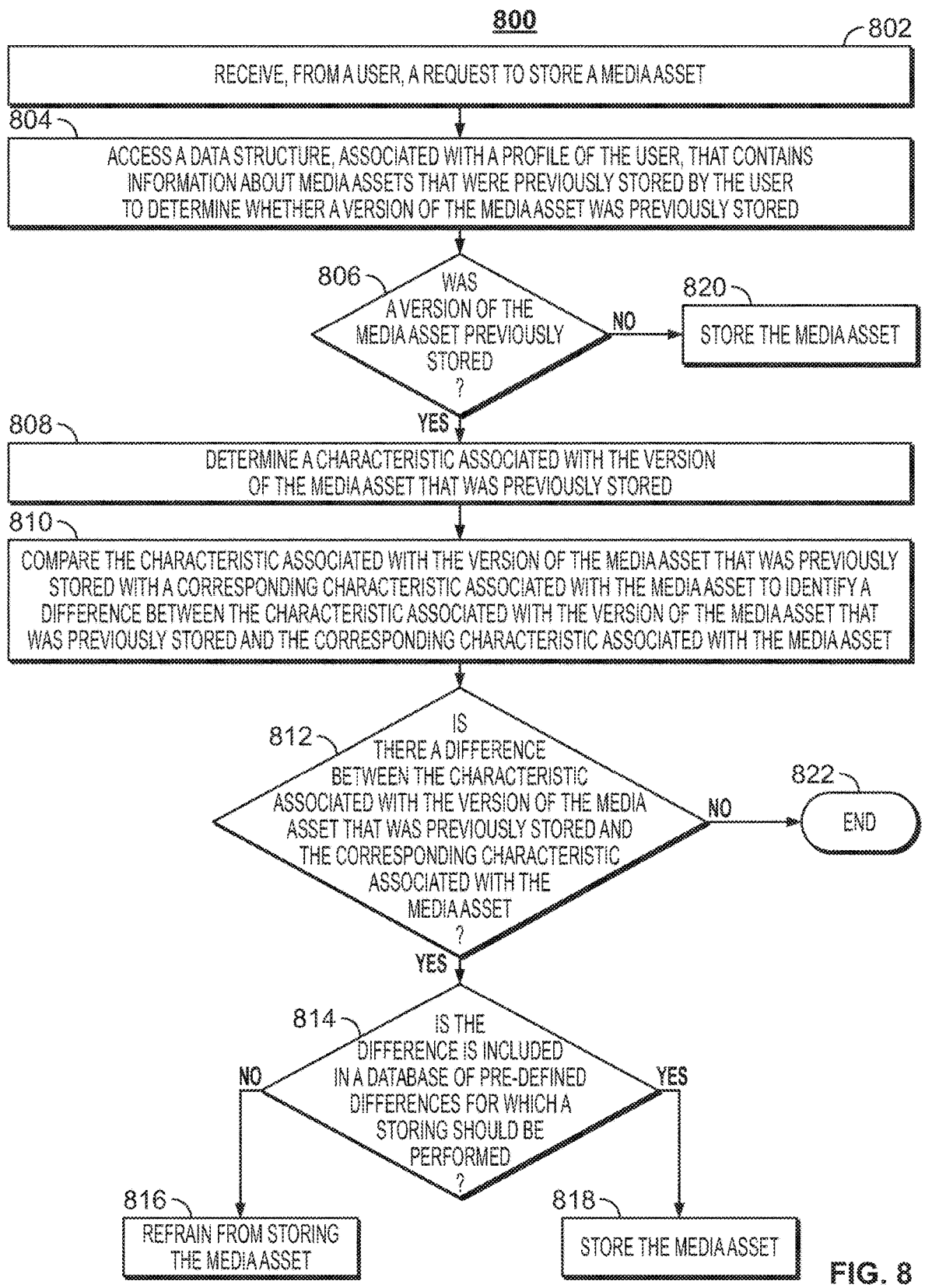
FIG. 8 is a flowchart of illustrative steps involved in selectively storing specific versions of previously stored media assets based on differences in characteristics between the specific versions and the previously stored media assets in accordance with some embodiments of the disclosure.

FIG. 8 is a flowchart of illustrative steps involved in selectively storing specific versions of previously stored media assets based on differences in characteristics between the specific versions and the previously stored media assets in accordance with some embodiments of the disclosure. Process 800 may be used to determine whether to store a media asset based on whether the media asset has an associated characteristic that renders the media asset preferable to the version of the media asset that was previously stored.

Process 800 begins at 802 where control circuitry 604 receives, from a user, a request to store a media asset. For example, control circuitry 604 may, upon receiving a selection of the selectable store option 114 via user input interface 610, receive a request from a user Tom to store the media asset corresponding to media asset identifier 104 (e.g., "How I Met Your Mother, Series Finale"). Process 800 continues to 804 where control circuitry 604 accesses a data structure, associated with a profile of the user, that contains information about media assets that were previously stored by the user to determine whether a version of the media asset was previously stored by the user.

Process 800 continues to 806 where control circuitry 604 determines whether a version of the media asset previously stored. If, at 806, control circuitry 604 determines that a version of the media asset was not previously stored, process 800 continues onto 820. At 820, control circuitry 604 stores the media asset. If, at 806, control circuitry 604 determines that a version of the media asset was previously stored, process 800 continues onto 808. For example, control circuitry 604 may query table 119 for media asset identifier 104 and retrieve the entry associated with media asset title value 132. Upon retrieving the entry, control circuitry 604 may determine that a version of the media asset corresponding to media asset identifier 104 was previously stored.

At 808, control circuitry 604 determines a characteristic associated with the version of the media asset that was previously stored. For example, control circuitry 604 may determine that the resolution characteristic associated with the previously stored version of the media asset "How I Met Your Mother, Series Finale" is SD. Manners in which control circuitry 604 may perform this determination discussed previously are applicable here. Process 800 continues to 810 where control circuitry 604 compares the characteristic associated with the version of the media asset that was previously stored with a corresponding characteristic associated with the media asset to identify a difference between the characteristic associated with the version of the media asset that was previously stored and the corresponding characteristic associated with the media asset. For example, control circuitry 604 may determine that the corresponding resolution characteristic associated with the media asset corresponding to media asset identifier 104 is 4K.

Process 800 continues to 812 where control circuitry 604 determines if there is a difference between the characteristic associated with the version of the media asset that was previously stored and the corresponding characteristic associated with the media asset. For example, Control circuitry 604 may use a Boolean comparison operation to determine if SD and 4K are identical. If, at 812, control circuitry 604 determines that there is no difference between the characteristic associated with the version of the media asset that was previously stored and the corresponding characteristic associated with the media asset, process 800 continues onto to 822 where process 800 ends. If, at 812, control circuitry 604 determines that there is a difference between the characteristic associated with the version of the media asset that was previously stored and the corresponding characteristic associated with the media asset, process 800 continues onto 814. For example, at 812, control circuitry 604 may determine that the difference to be SD-4K.

At 814, control circuitry 604 determines whether the difference is included in a database of pre-defined differences for which storing should be performed. For example, control circuitry 604 may query a database of pre-defined differences for which storing should be performed, located at any of the storage locations described in further detail below with respect to FIG. 6-7, for the difference SD-4K. Manners in which control circuitry 604 may perform this query discussed previously are applicable here. If, at 814, control circuitry 604 determines that the difference is not included in a database of pre-defined differences for which storing should be performed, process 800 continues to 816. At 816, control circuitry 604 refrains from storing the media asset. If, at 814, control circuitry 604 determines that the difference is included in a database of pre-defined differences for which storing should be performed, process 800 continues to 818. At 818, control circuitry 604 stores the media asset. For example, control circuitry 604 may determine that the difference SD-4K is included in the database of pre-defined differences at 814. At 818, control circuitry 604 stores the media asset corresponding to media asset identifier 104.

Figure 9:
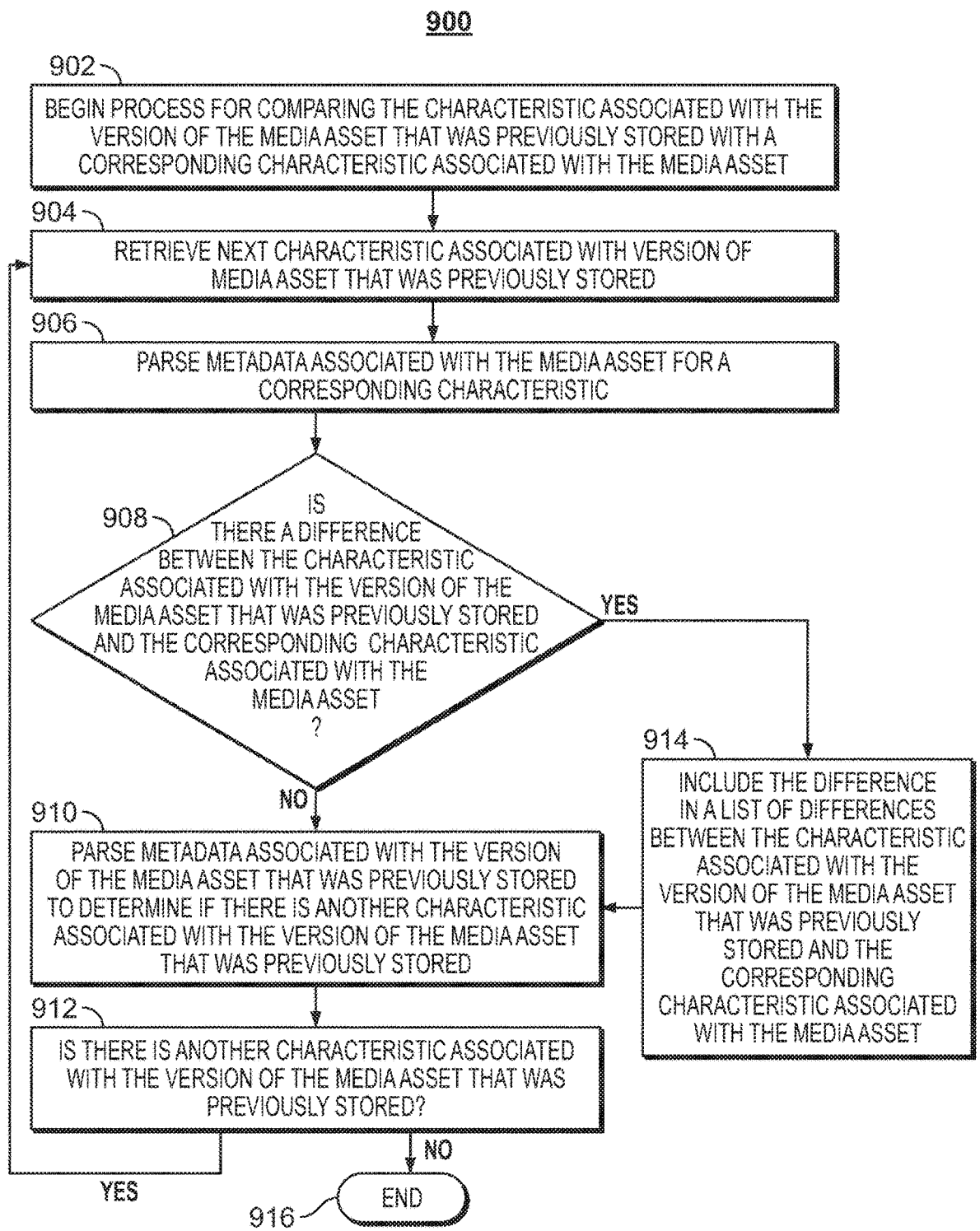
FIG. 9 is a flowchart of illustrative steps involved in comparing the characteristic associated with the version of the media asset that was previously stored with a corresponding characteristic associated with the media asset in accordance with some embodiments of the disclosure.

FIG. 9 is a flowchart of illustrative steps involved in comparing the characteristic associated with the version of the media asset that was previously stored with a corresponding characteristic associated with the media asset in accordance with some embodiments of the disclosure.

Process 900 begins at 902 where control circuitry 604 begins process for comparing the characteristic associated with the version of the media asset that was previously stored with a corresponding characteristic associated with the media asset. Process 900 continues onto 904 where control circuitry 604 retrieve next characteristic associated with the version of the media asset that was previously stored. For example, the control circuitry 604 may retrieve resolution value 138 associated with the media asset corresponding to media asset title value 132. Process 900 continues onto 906 where control circuitry 604 parses metadata associated with the media asset for corresponding characteristic. For example, control circuitry 604 may parse metadata associated with the media asset corresponding to media asset identifier 104 to determine the corresponding characteristic resolution indicator 108.

Process 900 continues onto 908 where control circuitry 604 determines whether there is a difference between the characteristic associated with the version of the media asset that was previously stored and the corresponding characteristic associated with the media asset. For example, control circuitry 604 may determine that the difference to be SD-4K. If, at 908, control circuitry 604 determines there is a difference between the characteristic associated with the version of the media asset that was previously stored and the corresponding characteristic associated with the media asset, process 900 continues on to 914. At 914, control circuitry 604 includes the difference in a list of differences between the characteristic associated with the version of the media asset that was previously stored and the corresponding characteristic associated with the media asset. For example, control circuitry 604 may include the difference SD-4K in the list of differences between characteristics of the media asset corresponding to media asset title value 132 and characteristics of the media asset corresponding to media asset identifier 104. If, at 908, control circuitry 604 determines there is no difference between the characteristic associated with the version of the media asset that was previously stored and the corresponding characteristic associated with the media asset, process 900 continues on to 910.

At 910, control circuitry 604 parses metadata associated with the version of the media asset that was previously stored to determine if there is another characteristic associated with the version of the media asset that was previously stored. Process 900 continues onto 912 where control circuitry 604 determines if there is another characteristic associated with the version of the media asset that was previously stored. For example, control circuitry 604 may determine that the media asset corresponding to media asset title value 132 also has the characteristic ending value 140 associated with it. If, at 912, control circuitry 604 determines there is another characteristic associated with the version of the media asset that was previously stored, process 900 reverts to 904. In this example, upon determining ending value 140 associated with the media asset corresponding to media asset title value 132, control circuitry 604 reverts to 904. If, at 912, control circuitry 604 determines there is no other characteristic associated with the version of the media asset that was previously stored, process 900 continues onto 916. At 916, process 900 ends.

Figure 10:
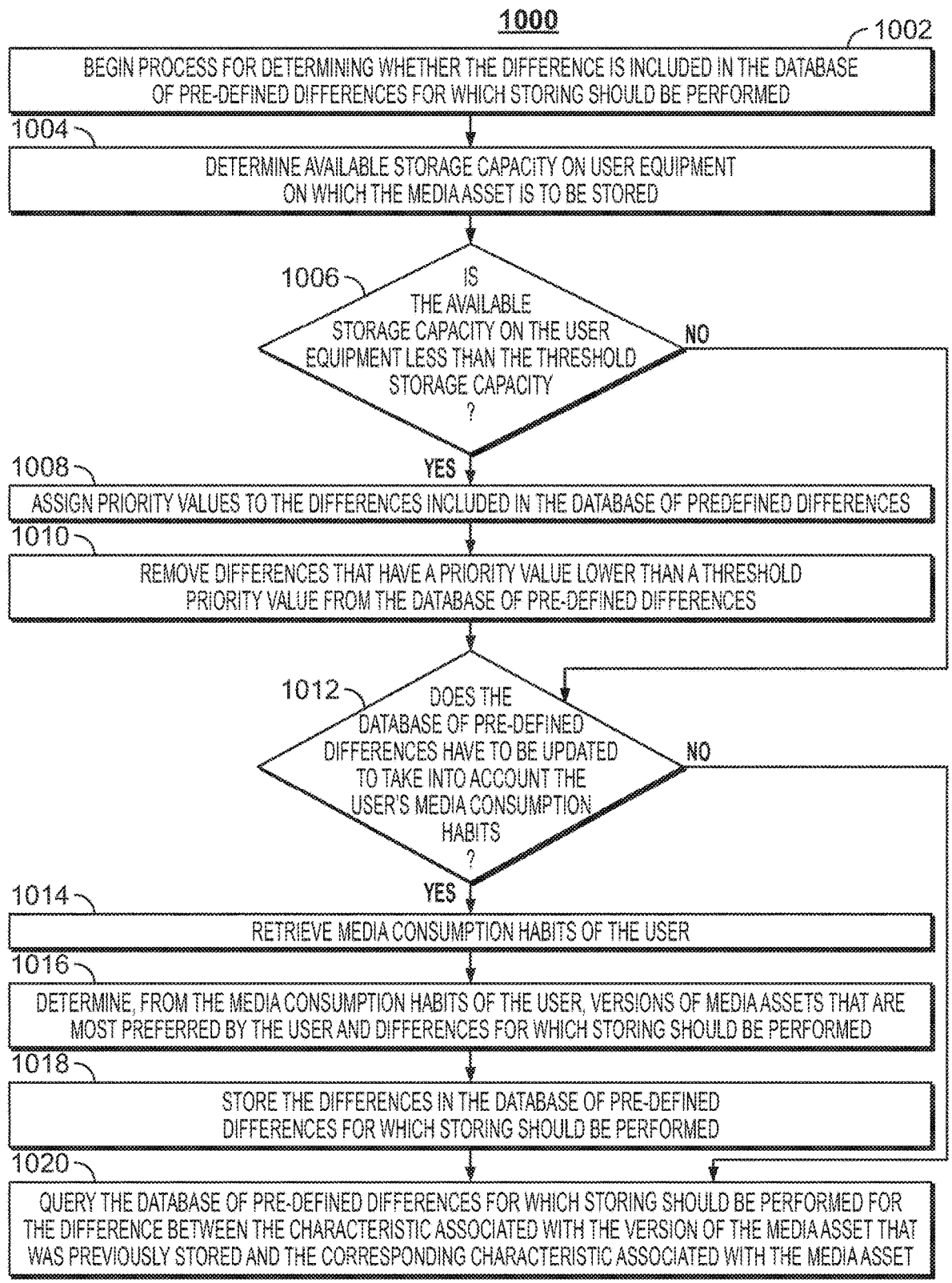
FIG. 10 is a flowchart of illustrative steps involved in determining whether the difference between the media asset and the version of the media asset that was previously stored is included in the database of pre-defined differences for which storing should be performed in accordance with some embodiments of the disclosure.

FIG. 10 is a flowchart of illustrative steps involved in determining whether the difference between the media asset and the version of the media asset that was previously stored is included in the database of pre-defined differences for which storing should be performed in accordance with some embodiments of the disclosure.

Process 1000 starts at 1002 where control circuitry 604 begins process for determining whether the difference is included in the database of pre-defined differences for which storing should be performed. Process 1000 continues to 1004 where control circuitry 604 determines available storage capacity on user equipment on which the media asset is to be stored. For example, control circuitry may determine that the media asset corresponding to media asset identifier 104 is to be stored on user equipment 304. Process 1000 continues to 1006, where control circuitry 604 determines whether the available storage capacity on the user equipment less than a threshold storage capacity. Control circuitry 604 may access a data structure associated with user equipment 304 (e.g., device properties data structure) to determine available storage capacity of user equipment 304. Control circuitry 604 may access another data structure (e.g., parameters threshold values data structure) to determine the threshold storage capacity. The data structures may be located at any of the storage locations described in further detail below with respect to FIG. 6-7. Control circuitry 604 may use a Boolean operation to compare the values retrieved.

If, at 1006 control circuitry 604 determines that the available storage capacity on the user equipment is less than the threshold storage capacity, process 1000 continues to 1008. At 1008, control circuitry 604 assigns priority values to the differences included in the database of pre-defined differences. For example, control circuitry 604 may determine that resolution is more important to the user than language of sub-titles. Accordingly, the media guidance application may assign the resolution differences higher priority than language of sub-titles differences. For example, control circuitry may assign SD-HD, HD-4K and SD-4K differences priority values of 10 and French sub-titles-English sub-titles priority values of 1. Process 1000 continues to 1010 where control circuitry 604 removes differences that have a priority value lower than a threshold priority value from the database of pre-defined differences. For example, control circuitry may determine that the threshold priority value is 5 and remove the French sub-titles-English sub-titles differences, which has a priority of 1, from the database of pre-defined differences.

From 1010, process 1000 continues to 1012. If, at 1006 control circuitry 604 determines that the available storage capacity on the user equipment is not less than the threshold storage capacity, process 1000 continues to 1012 as well. At 10212, control circuitry 604 determines whether the database of pre-defined differences has to be updated to take into account the user's media consumption habits. If, at 1012 control circuitry 604 determines that the database of pre-defined differences has to be updated to take into account the user's media consumption habits, process 1000 continues to 1014. At 1014, control circuitry 604 retrieves media consumption habits of the user.

Process 1000 continues to 1016 where control circuitry 604 determines, from the media consumption habits of the user, versions of media assets that are most preferred by the user and differences for which storing should be performed. For example, control circuitry 604 may extrapolate, from the media consumption habits of the user (e.g., genre of media assets watched, fast-forwarding, rewinding, re-watching trends and other suitable data), that the user prefers to watch media assets in the highest resolution available. Control circuitry 604 may also determine that the user never watches media assets with sub-titles and consequently, language of sub-titles is of little importance to the user.

Process 1000 continues to 1018 where control circuitry 604 stores the differences in the database of pre-defined differences for which storing should be performed. For example, control circuitry 604 may determine that differences corresponding to the requested media asset having a higher resolution than the version that was previously stored should be included in the database of pre-defined differences for which storing should be performed. For example, control circuitry 604 may determine SD-HD, HD-4K and SD-4K as differences for which storing should be performed and save these differences in the database of pre-defined differences for which storing should be performed.

From 1018, process 1000 continues to 1020. Process 1000 also continues to 1020 if, at 1012, control circuitry 604 determines that the database of pre-defined differences does not have to be updated to take into account the user's media consumption habits. At 1020, control circuitry 604 queries the database of pre-defined differences for which storing should be performed for the difference between the characteristic associated with the version of the media asset that was previously stored and the corresponding characteristic associated with the media asset.

It should be noted that processes 800-1000 or any step thereof could be performed on, or provided by, any of the devices shown in FIGS. 6-7. For example, any of processes 800-1000 may be executed by control circuitry 604 (FIG. 6) as instructed by the media guidance application implemented on user equipment 702, 704, and/or 706 (FIG. 7). In addition, one or more steps of process 800-1000 may be incorporated into or combined with one or more steps of any other process or embodiment.

It is contemplated that the steps or descriptions of FIGS. 8-10 may be used with any other embodiment of this disclosure. In addition, the steps and descriptions described in relation to FIG. 8-10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 6-7 could be used to perform one or more of the steps in FIGS. 8-10.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   storing, in association with a user profile, a first version of a media asset;
   receiving a request to store a second version of the media asset;
   determining, based on the user profile, whether the first version is preferable to the second version;
   in response to determining, based on the user profile, the first version of the media asset is preferable to the second version of the media asset, causing a client device to generate for simultaneous display a notification indicating a determination to refrain from storing the second version of the media asset, an indication of respective video resolutions of the first version of the media asset and the second version of the media asset, and a user selectable option to perform an action related to the first version of the media asset or the second version of the media asset;
   receiving a selection of the user selectable option to perform the action; and
   causing the action to be performed.

2. The method of claim 1, wherein the user selectable option is an option to override the determination to refrain from storing the second version of the media asset and cause the second version of the media asset to be stored, and performing the action comprises storing the second version of the media asset.

3. The method of claim 2, wherein performing the action further comprises deleting the first version of the media asset to free up storage space for storing the second version of the media asset.

4. The method of claim 1, wherein the user selectable option is an option to transfer the first version of the media asset to a different storage device.

5. The method of claim 1, further comprising:
   causing the client device to generate for display information about the first version of the media asset that was previously stored along with the user selectable option to perform the action.

6. The method of claim 5, wherein the information about the first version of the media asset further comprises subtitle information of the first version of the media asset.

7. The method of claim 1, wherein the first version is stored at a remote server.

8. The method of claim 1, wherein the first version is stored at a user equipment device.

9. The method of claim 1, further comprising:
   monitoring media consumption habits associated with the user profile;
   wherein determining, based on the user profile, the first version of the media asset is preferable to the second version of the media asset is based on the monitored media consumption habits associated with the user profile.

10. The method of claim 1, wherein:
    determining that the first version of the media asset was previously stored by the user comprises:
       accessing a data structure, associated with the user profile, that contains information about media assets that were previously;
    determining, based on the user profile, whether the first version is preferable to the second version comprises:
       determining a characteristic associated with the first version of the media asset that was previously stored;
       comparing the characteristic associated with the first version of the media asset that was previously stored with a corresponding characteristic associated with the second version of the media asset to identify a difference between the characteristic associated with the first version of the media asset that was previously stored and the corresponding characteristic associated with the second version of the media asset; and
       determining whether the difference is included in a database of pre-defined differences for which storing should be performed; and
    determining, based on the user profile, the first version of the media asset is preferable to the second version of the media asset comprises determining that the difference is not included in the database of pre-defined differences for which storing should be performed.

11. A system comprising:
    a storage device configured to:
       store, in association with a user profile, a first version of a media asset;
    control circuitry configured to:
       receive a request to store a second version of the media asset;
       determine, based on the user profile, whether the second version is preferable to the first version;

in response to determining, based on the user profile, the first version of the media asset is preferable to the second version of the media asset, cause the client device to generate for simultaneous display a notification indicating a determination to refrain from storing the second version of the media asset, an indication of respective video resolutions of the first version of the media asset and the second version of the media asset, and a user selectable option to perform an action related to the first version of the media asset or the second version of the media asset;
receive a selection of the user selectable option to perform the action; and
cause the action to be performed.

12. The system of claim 11, wherein the user selectable option is an option to override the determination to refrain from storing the second version of the media asset and cause the second version of the media asset to be stored, and the control circuitry is configured to perform the action by storing the second version of the media asset.

13. The system of claim 12, wherein the control circuitry is configured to perform the action by deleting the first version of the media asset to free up storage space for storing the second version of the media asset.

14. The system of claim 11, wherein the user selectable option is an option to transfer the first version of the media asset to a different storage device.

15. The system of claim 11, wherein the control circuitry is further configured to:
cause the client device to generate for display information about the first version of the media asset that was previously stored along with the user selectable option to perform the action.

16. The system of claim 15, wherein the information about the first version of the media asset further comprises subtitle information of the first version of the media asset.

17. The system of claim 11, wherein the first version is stored at a remote server.

18. The system of claim 11, wherein the first version is stored at a user equipment device.

19. The system of claim 11, wherein the control circuitry is further configured to:
monitor media consumption habits associated with the user profile;
determine, based on the user profile, the first version of the media asset is preferable to the second version of the media asset is based on the monitored media consumption habits associated with the user profile.

20. The system of claim 11, wherein:
determining that the first version of the media asset was previously stored by the user comprises:
accessing a data structure, associated with the user profile, that contains information about media assets that were previously;
determining, based on the user profile, whether the first version is preferable to the second version comprises:
determining a characteristic associated with the first version of the media asset that was previously stored;
comparing the characteristic associated with the first version of the media asset that was previously stored with a corresponding characteristic associated with the second version of the media asset to identify a difference between the characteristic associated with the first version of the media asset that was previously stored and the corresponding characteristic associated with the second version of the media asset; and
determining whether the difference is included in a database of pre-defined differences for which storing should be performed; and
determining, based on the user profile, the first version of the media asset is preferable to the second version of the media asset comprises determining that the difference is not included in the database of pre-defined differences for which storing should be performed.

* * * * *